COLOR TELEVISION RECEIVER

Filed Aug. 30, 1965 3 Sheets-Sheet 1

Inventor
Satoshi Shimada by Hill, Sherman, Meroni, Gross & Simpson Attys.

March 5, 1968 SATOSHI SHIMADA 3,372,232

COLOR TELEVISION RECEIVER

Filed Aug. 30, 1965 3 Sheets-Sheet 2

Inventor
Satoshi Shimada by Hill, Sherman, Meroni, Gross & Simpson Attys.

Inventor
Satoshi Shimada by Hill, Sherman, Meroni, Gross & Simpson Attys.

3,372,232
COLOR TELEVISION RECEIVER
Satoshi Shimada, Tokyo, Japan, assignor to Sony Corporation, Tokyo Japan, a corporation of Japan
Filed Aug. 30, 1965, Ser. No. 483,619
15 Claims. (Cl. 178—5.4)

ABSTRACT OF THE DISCLOSURE

A phosphor strip kinescope television receiver having means for applying a luminance signal to the electron gun of the color kinescope and including first and second delaying circuits for delaying the luminance signal for substantially the duration and twice the duration respectively of the horizontal sweep. The luminance signal, the delayed signal, and the subsequently delayed signal are rapidly switched by means of an oscillator circuit to cause each of said three signals to impinge on each vertical phosphor strip. Grid means are provided to assure that only one color is illuminated during each horizontal sweep, and the proper color difference signal is added to the luminance signals during the given color sweep. In this way, all of the picture information is applied to each color phosphor strip through sequential horizontal sweep illumination.

This invention relates to a color television receiver. It particularly relates to a color television receiver which employs the line-sequential method of color reproduction and which adaptable to the present United States and Canadian system of color broadcast—the so-called N.T.S.C. system.

More particularly the invention relates to a phosphor strip kinescope television receiver in which compatibility, the ability to reproduce both color and monochrome television broadcasts, is materially increased. A major problem that has existed in many posts deflection-type kinescope receivers is the interelectrode capacitance cross-coupling at the screen grid. Most conventional receivers of this type have required very rapid switching of potential levels on adjacent phosphor screen grid wires, which grid wires must of necessity be placed very close to one another. Such rapid potential switching of close electrodes creates a problem especially during monochrome reproduction as it tends to introduce annoying spurious color and to decrease resolution of the picture.

The N.T.S.C. system of color television presently in use in the United States is primarily adapted to dot sequential color reproduction. A good outline of the N.T.S.C. system of color broadcast is found in Chapter 2 of Color Television Fundamentals by Milton S. Kiver (2d Edition, 1964; New York, McGraw-Hill). One feature of this system is the provision of hue information by quadrature modulation on a 3.58 megacycle subcarrier signal. The color information is broadcast in such a manner that the entire hue information relating to elemental elements or "dot" of the picture to be reproduced is transmitted sequentially. An alternative approach would be to transmit part of the hue information, e.g., the red information relating to one line or one field followed by a second, e.g., the blue information, and so on.

The present common commercial color television kinescope or picture tube employs a very large number of phosphor triads—three minute "dots" of red, green and blue light-producing phosphor. These "dots" are individually excited by different ones of three electron streams produced by three separate electron guns which are intensity modulated by the detected and reconstructed color information signal. The highly complex (and expensive) nature of this kinescope has suggested the use of alternative types of kinescopes. One alternative is the post-deflection color phosphor strip kinescope. This kinescope uses a single electron gun and a plurality of phosphor strips with grid wires positioned adjacent the screen to deflect the electron stream, after its initial deflection by the conventional scanning mechanism to selected phosphor strips. This type of kinescope has not met with widespread commercial success because of the difficulties inherent in the adoption of the strip tubes to the elemental color hue broadcasting of the N.T.S.C. system resulting largely from inter-grid wire capacitance. This inter-grid wire capacitance has resulted in interference or crosstalk at the higher frequency which has limited the use of these kinescopes.

It is therefore a specific object of this invention to provide a color television receiver employing a post-deflection kinescope in which the interelectrode capacitance adverse effects of the post deflection grid is materially reduced (or eliminated entirely) and in which a monochrome and a color picture may be produced with improved clarity and resolution.

It is the general object of this invention, however, to provide a novel line-sequential color television receiver.

Another object of this invention is to provide an improved color television receiver in which resolution in the vertical direction is increased more than that obtainable in conventional line-sequential television receivers.

A further object of this invention is to provide a N.T.S.C. line-sequential color television receiver of increased resolution.

A still further object of this invention is to provide a color television receiver in which color display of high resolution can be obtained by the provision of simple equipment.

It is a feature and object of this invention to provide such a receiver in which the need for such rapid switching is eliminated and to provide for more perfect monochrome picture reproduction by eliminating integrid capacitance errors.

In accomplishing these objectives according to the present invention, a color television is provided with a post-deflection strip kinescope and means for modulating the electron stream of said kinescope in a direction transverse to the sweep of said beam with information representing the prior sweep.

In accordance with one aspect of the invention, the kinescope electron beam is cyclically deflected in the vertical direction by a wobbling coil at a predetermined frequency greater than the horizontal sweep frequency while said beam is intensity modulated with luminance information of luminance signals, corresponding to the luminance signals of different vertical sweeps, sequentially at the same frequency of the cyclic vertical deflection so as to effectively sweep more than one line during each horizontal sweep.

In accordance with another aspect of the invention, a color television receiver is provided with a single electron gun post-deflection kinescope in which the electron stream is modulated at different areas of its cross-section with different signals corresponding to different line luminance signals to sweep more than one effective line for every horizontal sweep.

In accordance with one feature of this invention, provision is made for a color television receiver in which the path taken by an electron beam on phosphors of respective colors is increased by deflecting the electron beam in a certain amplitude and cycle in the transverse direction with respect to travel of the horizontal scanning line and vivid color display is thereby accomplished.

Other objects, features and advantages of this invention will become apparent from the following description taken in conjunction with the accompanying drawings, in which.

Figure 1:
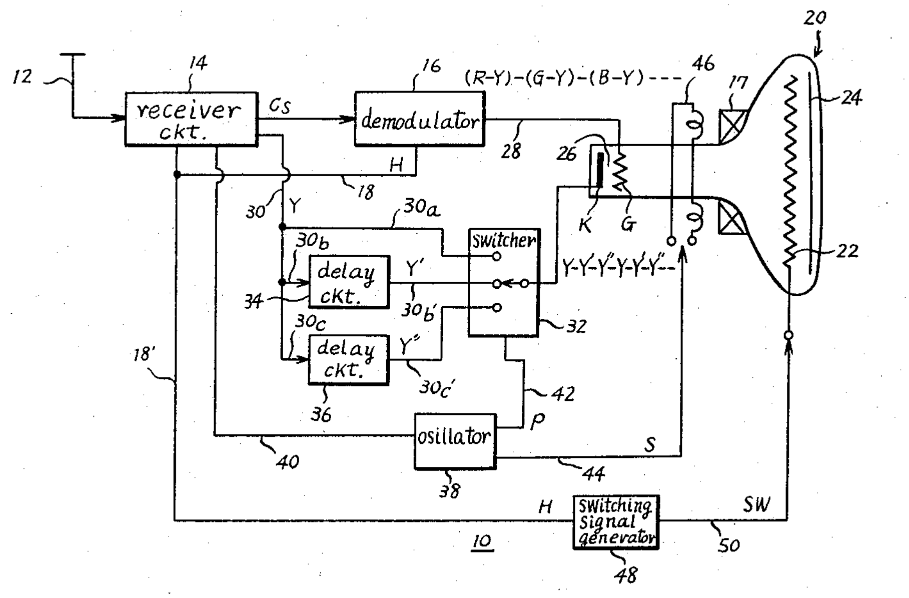
FIG. 1 is a schematic block diagram illustrating an example of the line-sequential color television reproducing receiver constructed according to the principles of this invention.

Referring to FIG. 1 there is depicted a television receiver constructed in accordance with the principles of the present invention which is generally indicated by the numeral 10. The receiver 10 includes an antenna 12 which may be of conventional construction which feeds a received television broadcast signal into receiving circuits 14. The circuits 14 serve the conventional function of tuning, detecting and amplifying the signal from the antenna 12. Included within the circuits 14 may be a conventional sound signal separator, detector, amplifier and reproducer. Also included in the circuits 14 may be the conventional sweep voltage developing means including means for developing the horizontal sweep synchronizing pulse H. As these and certain other parts of the receiver 10 do not in themselves constitute part of the present invention; may be entirely conventional; and are well known to those familiar in the art, they have not been depicted and will not be described in detail except insofar as is necessary for an understanding of the present invention.

The television receiver 10 receives and reproduces either monochrome or N.T.S.C. color broadcasts. When a color broadcast is received the receiving circuits 14 develop a chroma-signal $C_S$ which is fed to a color decoder or detector 16. The detector 16 is of the synchronous type, i.e., it develops a signal from the chroma-signal $C_S$ sampled at a particular phase relationship relative to a reference phase. The chroma-signal $C_S$ is developed at the broadcast station by combining two 3.58 megacycle signals each modulated with chroma information relating to two specific color contents of a color picture. The two signals are combined at a phase difference of 90° to yield the composite signal $C_S$. As is well known, this signal $C_S$ may be synchronously demodulated by homodyning with a 3.58 megacycle signal of a specific phase to yield not only one or the other of the initial specific color signals but also any other hue signal desired than can result from the combination of the two initial hues. Thus, by proper choice of the phase angle of the homodyning 3.58 mc. signal, the color difference signals $R-Y$, $G-Y$ or $B-Y$ may be produced.

In accordance with one form of the invention, the demodulator 16 sequentially demodulates $R-Y$, $G-Y$ and $B-Y$ signals by changing the axis of demodulation in response to the reception of the horizontal pulses H from the circuits 14 through the line 18. Thus, the demodulator

16 yields $R-Y$ for one horizontal sweep period followed by $G-Y$ for the next horizontal sweep period, followed by $B-Y$ for the next period. The cycle is then repeated. The sequence of color difference signals is fed from the demodulator 16 to a single electron gun color kinescope 20. The kinescope 20 is of the post-deflection type and has a post-deflecting control grid 22 situated adjacent a vertical strip phosphor screen 24. Part of the tube 20 is a conventional electron gun apparatus 26 which includes a grid G and a cathode K. The line-sequential color difference signals, which are aligned in synchronism with the horizontal synchronizing pulses H, are fed from the demodulator 16 via the line 28 to the control grid G where these signals cooperate with the signal on the cathode K to intensity modulate the electron screen developed by the electron gun 26.

The color kinescope 20 also has a conventional deflection coil 17 for deflecting the electron screen developed by the electron gun 26 across the screen 24. The coil 17 is energized by the sweep signals developed by the circuits 14 in the conventional manner.

The receiver circuits 14 also conventionally develop a luminance signal Y which, in accordance with the invention, is fed from line 30 to a switcher 32 via line 30*a* to a first delay circuit 34 via line 30*b* and to a second delay circuit 36 via line 30*c*. The outputs of the delay circuits 34 and 36 are, respectively, designated Y′ and Y″ and represent the luminance signal Y delayed by one horizontal sweep period, in the case of Y′; and by two horizontal sweep periods, in the case of Y″. The signals Y′ and Y″ are fed, respectively, from the delay circuits 34 and 36 through lines 30*b′* and 30*c′* to the switcher 32.

An oscillator 38 which may be the 3.58 megacycle oscillator used to demodulate the $R-Y$, $G-Y$, $B-Y$ signals in demodulator 16 is connected by line 40 to receiver circuits 14. The oscillator 38 serves to develop an oscillatory signal having a frequency very much greater than the horizontal sweep frequency. This high frequency signal is designated P and is applied through line 42 to switcher 32. A second oscillator signal output is designated S and is applied through line 44 to a transverse sweep-deflecting means comprising a wobbling coil 46 situated about the neck of the kinescope 20 for cyclically deflecting the electron screen developed by an electron gun 26 in the vertical direction.

Also in accordance with the invention, a switching signal generator 48 is provided for generating a switching signal $S_W$ which is applied through line 50 to the grid 22 of the kinescope 20. The switching signal generator 48 is synchronized by the horizontal synchronizing pulse signal H derived from the receiver circuits 14 and fed to the switching signal generator 48 through line 18′.

Figure 2B:
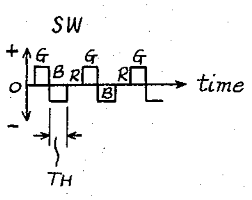
FIG. 2B is a diagram illustrating the color switching signal of step wave form to be applied to a color switching grid of FIG. 2.
Figure 2A:
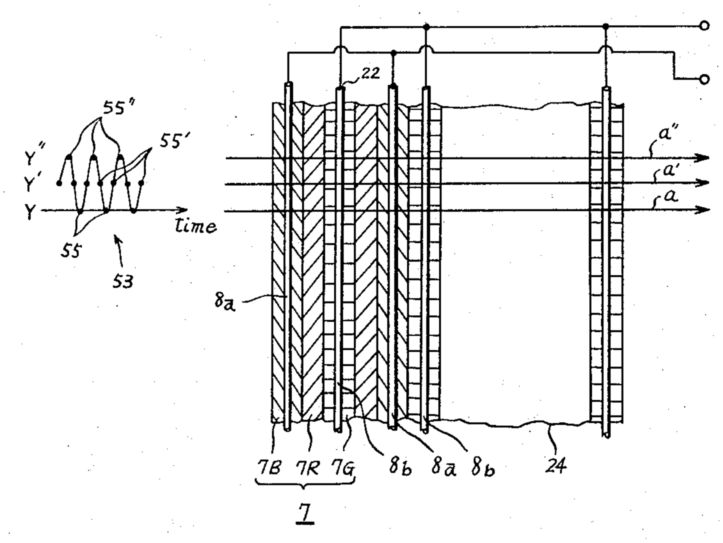
FIG. 2A is a partially schematic diagram illustrating the strip fluorescent screen and deflection grids of the kinescope of the receiver of FIG. 1 and a diagram illustrating the path to be taken by the electron beam on this screen used in explaining the present invention.

In FIG. 2A, a section of the vertical striped phosphor screen 24 and grid 22 as viewed from within the tube 20, is depicted. This screen comprises a succession of vertical elementary strips or strips of different colored phosphor. These vertical phosphor strips are arranged in a sequential order horizontally across the screen 24 in the direction of the horizontal sweep in the order of a blue light-producing strip 7B followed by a red light-producing strip 7R which is followed by a green light producing strip 7G. Each triad of strips 7B, 7R and 7G forms an elementary color reproducing unit 7. The triad of strips of unit 7 is repeated horizontally across the surface of the screen 24. The grid 22 comprises a plurality of vertical grid wires 8*a* and 8*b*, respectively, vertically situated at approximately the mid-points of the vertical strips 7B and 7G. The arrangement of wires 8*a* and 8*b* is similarly repeated horizontally across the surface of the screen 22.

In operation, the receiver 10 develops a monochrome or color picture from a received signal on the screen 24 of the kinescope 20. The received broadcast color signal is detected in receiving circuits 14 and the color subcarrier signal $C_S$ is fed from the receiving circuits 14 to the demodulator 16. Also developed by the receiver 14 is a horizontal synchronizing signal H which is fed via line 18 to demodulator 16. The demodulator 16 serves to develop *R—Y, G—Y, B—Y* signals in line sequence from the signal $C_S$. These signals are fed from line 28 to the grid G of the electron gun 26. Also developed by the receiver circuits 14 is the luminance signal Y which is fed from via lines 30, 30*a*, 30*b* and 30*c* through the delay circuits 34 and 36 to switcher 32. The switcher 32 is activated by the output signal P of the oscillator 38 so as to form an output which is fed to the cathode comprising Y, Y′, Y″, Y, Y′, Y″, i.e., the switcher 32 develops a signal sampling the voltage level of the luminance signal Y, the delayed luminance signal Y′ and the further delayed luminance signal Y″ at a rate of three samples per cycle of the signal P. The oscillator 38 also feeds a 3.58 megacycle signal S to the wobbling coil 46 which serves to deflect the electron beam from the electron gun 36 in a vertical direction at a rate of 3.58 megacycles. Also developed from the switching signal generator 48 is a switching signal $S_W$ having the shape shown in FIG. 2B. Referring to that figure, it can be seen that the switching generator 48 biases the grid 22 depicted in FIG. 2A in a sequential manner corresponding to the horizontal sweep time $T_h$. The signal generator 48 is synchronized by the horizontal synchronized pulse H from the receiver circuits 14 to produce a "green" deflection voltage for one horizontal sweep followed by a "blue" deflection voltage for the next horizontal sweep, followed by a "red" deflection voltage for the next horizontal sweep.

The line-sequential color difference signals (*R—Y*), (*G—Y*), (*B—Y*) . . . are supplied to the grid G of the electron gun 26, while there is applied to the other grid 22 from a color switching signal generator 48 a switching signal $S_W$ of a step wave repeating in a manner such as "0"·"+"·"—"·"0"·"+" . . . as illustrated in FIG. 2B. The switching signal $S_W$ is synchronized with the horizontal synchronizing pulse and accordingly it has a time period $T_H$.

The luminance signal is supplied to the cathode K of the electron gun 26. In such a case, there are supplied dot-sequential luminance signals such as the luminance signal Y, another luminance signal Y′ followed by another luminance signal Y″. In such a case, as stated above, the luminance signal Y′ corresponds to a delayed luminance signal of Y, further the luminance signal Y″ corresponds to a delayed luminance signal of Y′, and then a further luminance signal Y″.

Graft 53 of FIG. 2A illustrates the result of the application of the 3.58 mc. signal to the wobbling coil 46 and the rapid switching of switcher 32 at the same frequency. The switcher 32 is maintained in synchronism with the coil 46 so as to sample the delayed luminance signal Y″ at the upper segments 55″ of the micro-deflection caused by the wobbling coil 46. These upper portions 55″ lie about a horizontal line *a*″ parallel to that which would be swept out by the electron beam of the electron gun 26 about the wobbling coil 46. Similarly the central portion 55′ of the wobbling electron beam is coincident with the sampling of delayed luminance signal Y′ and lies along a horizontal line *a*′ parallel to line *a*″. Also similarly the bottom portion 55 of the wobbling electron beam is coincident with the sampling of the luminance signal Y and lies about a line parallel to lines *a*″ and *a*. It should be noted that the uppermost sweep line *a*″ corresponds to the twice delayed luminance signal Y″ while the middle sweep line *a*′ corresponds to the one horizontal sweep time-delayed Y′ and the sweep line *a*′ corresponds to the undelayed sweep line luminance signal Y.

Figure 3:
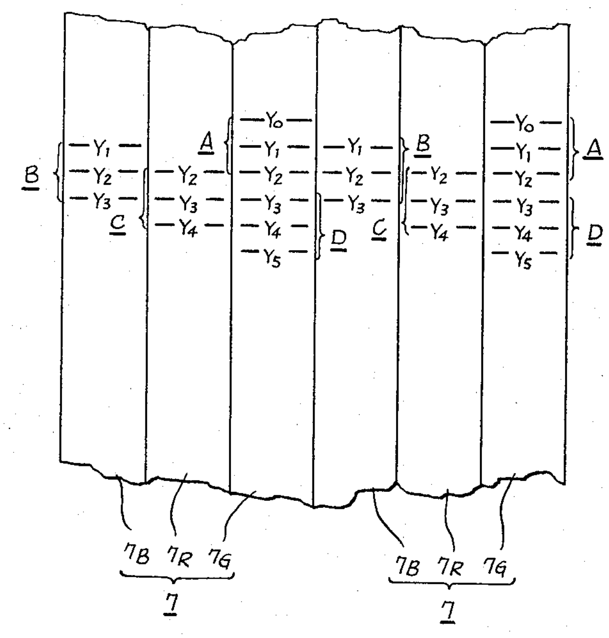
FIG. 3 is a partial representation of the kinescope screen of FIGS. 1 and 2A used in explaining the makeup of a monochrome television picture.

Referring now to FIG. 3, the method of reproducing a monochrome signal is there depicted. Six vertical strips 7B, 7R, 7G, two cycles of the blue, red and green strips 7 are depicted. During one horizontal sweep of the electron beam produced by the electron gun 26, the switching grid 22 has a switching grid signal G impressed upon it so that the electron beam would sweep only the strip 7G. During the sweep, because of the coaction between the wobbling cable 46 and the switcher 32, three effective lines are produced upon the grid strips 7G corresponding to one sample luminance signal $Y_0$, a second sample of the luminance signal $Y_1$ representing a luminance signal occurring one horizontal sweep period later than the luminance signal $Y_0$, and a third sample of the luminance signal $Y_2$ representing a horizontal luminance signal correspondingly delayed by two horizontal sweep periods. This triad of reproduced signals is labeled A in FIG. 3. During the next horizontal sweep, the blue signal of $S_W$ would be impressed upon the grid 22 from the switching signal generator 48 so that only the blue strips 7B would be swept by the electron stream from the electron gun 26. Because of the coaction between the wobbler coil 46 and the switcher 32, three effective horizontal sweep lines are swept out upon the blue strips $7_B$. Because of the passage of time from the first horizontal sweep, the signals corresponding to $Y_1$, $Y_2$ and $Y_3$ are swept out one horizontal sweep line lower as shown at the point designated B. During the next horizontal sweep, a similar triad of signals $Y_2$, $Y_3$ and $Y_4$ designated C is swept out upon the red strips $7_R$ during the succeeding signal of sweeps, strips $7_G$ would again be swept, this time with further delayed signals $Y_3$, $Y_4$ and $Y_5$ designated D. It should be noted that the signals $Y_1$ of the second sweep correspond in vertical placement on the screen 24 to the signals $Y_1$ of the first horizontal sweep and that the signals $Y_2$, $Y_3$ of the third horizontal sweep correspond in vertical placement with the signals $Y_2$ and $Y_3$ of the first and second horizontal sweeps. Likewise, the signals $Y_3$ and $Y_4$ have a vertical placement aligned with the signals $Y_3$ and $Y_4$ of the previous two sweeps. In this manner, it can be seen that the Y signals are in alignment across the entire screen 24. In this manner, the entire signal picture may be constructed in which every part of the color strip of the screen 24 would have been swept by an effective line corresponding to every horizontal sweep line and an entire picture representing the luminance signal would be presented.

With such an arrangement, a color picture can also be produced in the line-sequential manner. Since the wobbling coil 41 is provided and the signal S is applied thereto, the electron beam carries out horizontal scanning while micro-deflecting in a vertical direction in accordance with the high frequency signal S. When the electron beam deflects to an upper position from a certain horizontal scanning line *a*, (FIG. 2A), the electron beam is density modulated by the luminance signal Y′ and a color is thereby produced on the horizontal scanning line *a*′. When the electron beam deflects uppermore, it is density-modulated by the luminance signal Y″ on the scanning line *a*″.

The color picture is built up in the same manner as the monochrome picture except that during color picture reproduction, the color difference signals are impressed upon the grid G of the electron gun 26. Thus, in the first sweep A described above in conjunction with FIG. 3, the electron beam would sweep out three effective lines across the strips 7G but a color difference signal *G—Y* would be modulated on the electron beam in addition to the luminance information. Similarly when sweep B is carried out the blue color difference signal would be impressed upon the grid G and when sweep C is carried out the red color difference signal from demodulator 16 would be impressed upon the grid G.

Figures 3A, 3B:
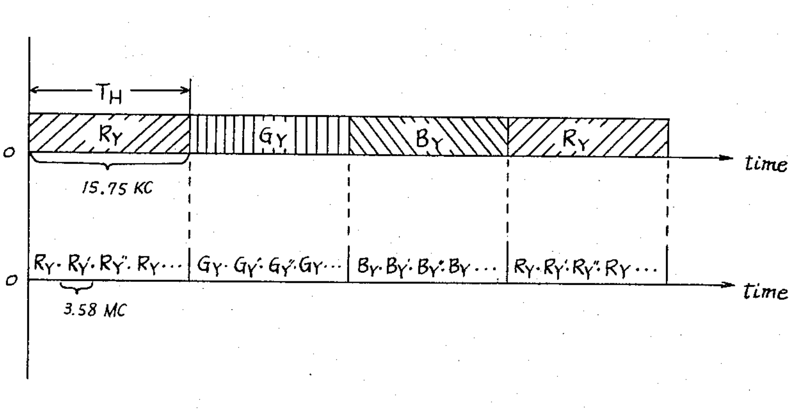
FIG. 3A is an explanatory diagram showing color display by the scanning of the conventional line-sequential color television.
FIG. 3B is an explanatory diagram showing color display by the scanning of the line-sequential color television according to this invention.

FIG. 3B illustrates such scanning system for color display of this invention, while FIG. 3A shows the line-sequential color television system employed in the prior art. In some prior art, line-sequential color television receives an entire line $R_y$, $G_y$ or $B_y$ which would be sweeped during one horizontal sweep period $T_H$. According to the present invention three lines are swept out by producing signals $R_y$, $R_y'$, $R_y''$, etc., at a rate of 3.58 megacycles during each period $T_H$.

According to this invention, color display is carried out by a plurality of horizontal scanning lines such, for example, as three lines with respect to each line scanning, so that resolution can be increased.

Figure 4:
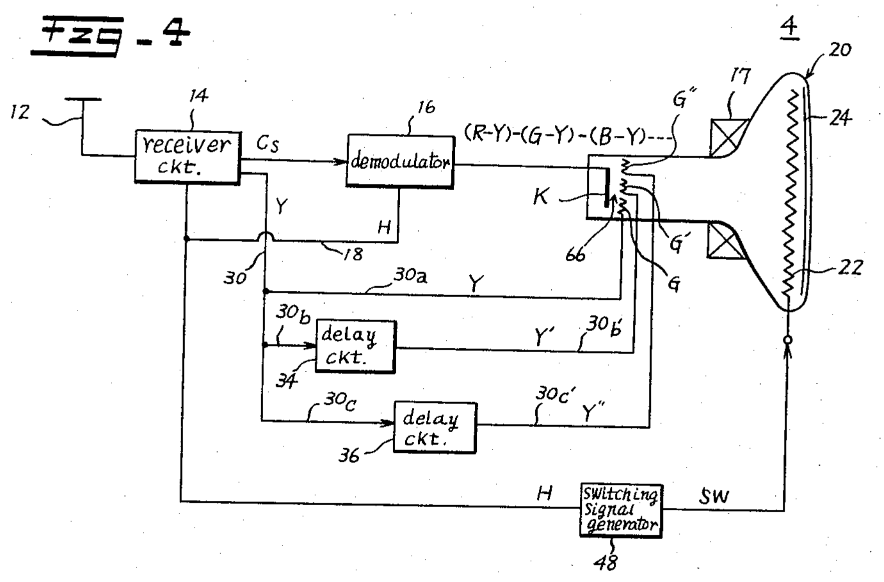
FIG. 4 is a schematic block diagram illustrating another embodiment of the present invention.
Figure 5A:
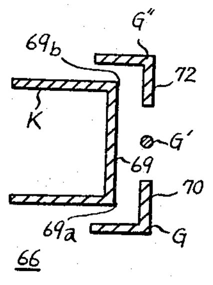
FIG. 5A is a side view illustrating an example of an electron gun of the cathode ray tube employed in the system shown in FIG. 4.
Figure 5B:
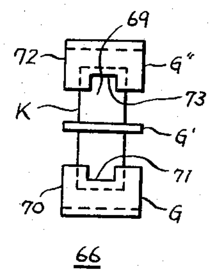
FIG. 5B is a front view of the electron gun shown in FIG. 5A.

Referring now to FIG. 4, there is illustrated a second embodiment of the invention. In this embodiment the need for the switcher 32 and the wobbling coil 46 is eliminated. Also in this embodiment, the antenna 12, receiving circuits 14 and the demodulator 16 function to develop the signals $(R-Y)$, $(G-Y)$, $(B-Y)$ . . . which are delivered, however, to the cathode in a radially different electron gun 66 rather than the grid of the conventional electron gun 26 of the embodiment of FIG. 1. The luminance signal Y is similarly fed directly by line 30A to one grid of the electron gun 66. The luminance signal Y is delayed in delay circuit 34 by one horizontal sweep, and is fed directly to a second grid G′ via line 30*b*′. The signal Y″ which is similarly developed from a delay circuit 36 in a manner similar to the previous embodiment is fed directly to a third grid G″ via line 30C. The switching signal generator 48 functions as before to produce a single horizontal sweep grid potential so as to deflect the electron beam of the valve by the electron gun 66 to the red, green and blue vertical strips of the kinescope 20 during sequential horizontal sweeps. The electron gun 66 is depicted in greater detail in FIGS. 5A and 5B. FIG. 5A is a side view in section of the electron gun 66 comprising a cathode K having a generally rectangular vertical emission surface 69 which has its greater dimension along the vertical. The grids G, G′ and G″ are solid pieces of metal, the lower grid G and upper grid G″ have an L-shaped cross-section generally complementary in shape with the lower and upper corners 69*a*, 69*b* of the cathode K. One vertical leg member 70 of the lower grid G extends over the lower portion of the surface 69 of the cathode K. Similarly the grid G″ has a vertical depending leg member 72 extending vertically downward and masking the upper part of the cathode surface 69. The grid G′ constitutes a lateral or horizontal wire aligned in a plane formed by the members 70 and 72 of the grids G and G′ and displaced midway between these grids so as to effect the centermost portion of the electron screen developed from the cathode K surface 69. As may better be seen in FIG. 5B, the grids G and G″ have a central rectangular notch or cutout area 71 and 73 in their vertical members 70 and 72 extending outward from their horizontal edges adjacent the grid G. The cutouts 71 and 73 are bounded by edges of the grids G and G″ generally parallel with the outer edges of the rectangularly shaped cathode *e* surface 69 of the cathode K. An electron gun 66 of this shape will produce a beam having a generally rectangular cross-section with a vertical major dimension in which the upper portion of which is modulated in intensity in accordance with the potentials impressed upon the grid G″, the lower portion of which is modulated in accordance with the potentials impressed upon the grid G′ and the center portion is modulated by the potentials impressed upon the grid G′. In this manner, an electron beam is produced which is effectually tri-modulated so as to produce three effective sweep lines per horizontal sweep of the electron stream on the screen 24 of the kinescope 20. The cooperation of the grid 22 switching signal $S_W$ generating generator 48 with this beam will reproduce kinescope color and monochrome pictures in a manner similar to that of the embodiment of FIG. 1.

It should be obvious that while applicant's invention has been described in conjunction with a tri-color phosphor screen of the strip type that the invention is equally adaptable to a two-color screen and while the invention has been described in conjunction with an effective three-line sweep per horizontal line sweep of the electron beam that a different number of sweep lines could equally be effected without departing from the spirit of the invention.

It should be noted that the sweep switching signal generator 48 produces a signal $S_W$ which varies at the rate of the horizontal sweep, i.e., in conventional television circuitry, 15.75 kilocycles per second. This is a relatively low frequency of switching and materially decreases the effects of inner electrode capacitances between adjacent grid wires 8*a* and 8*b* of the grid 22. This lower frequency of switching materially reduces crosstalk between the various grid signals and increases the color purity in reproduction of the signals.

The described color television receiver reproduces color images by the coacting of a specific horizontal sweep demodulated color difference signal and three horizontal sweep luminance signals. This system has been found to produce adequate color reproduction while resulting in a material saving in components. However, if desired, the principles of the invention may be used with a plurality of demodulators in which case delayed corresponding red, green and blue color signals could be used.

It is now apparent that a new and improved color television receiver has been provided employing a post-deflection kinescope in which adverse effects are materially reduced or entirely eliminated and in which a monochrome and color picture may be produced with improved clarity and resolution.

It will be apparent that many modifications and variations may be effected without departing from the scope and the novel concepts of the present invention.

I claim as my invention:

1. A color television receiver comprising a color cathode ray tube having an electron gun, a screen consisting of a plurality of color phosphor strips and a color-switching grid adjacent to said screen, means for applying a color difference signal to said gun, means for applying a luminance signal and a delayed luminance signal every horizontal line scanning to said color cathode ray tube, means for wobbling an electron beam vertically at a high frequency, said frequency being large with respect to said frequency of the horizontal line scanning, means for switching said luminance signal and said delayed luminance signal synchronized with said high frequency and means for applying a color switching signal synchronized with said frequency of the horizontal line scanning to said color cathode ray tube.

2. A color television receiver as claimed in claim 1, wherein said high frequency is a color subcarrier of the N.T.S.C. type color signal.

3. A color television receiver as claimed in claim 1, wherein said electron beam is micro-deflected vertically over the width of approximately three scanning lines.

4. A color television receiver as claimed in claim 1, wherein said wobbling means are provided with an electro-magnetic deflection coil adjacent a horizontal and vertical deflection coil means.

5. A color television receiver comprising a color cathode ray tube having an electron gun for generating an electon beam, a screen consisting of a plurality of color phosphor strips and a color switching grid adjacent to said screen, means for generating a luminance and delayed luminance signals, means for controlling at least three portions of said electron beam in response to the modulation of said luminance signal and delayed luminance signals, means for applying a color difference signal to said gun, said electron beam being elongated in cross-section vertically on said screen and, means coupled to said color switching grid for color selecting every horizontal line scanning.

6. A color television receiver as claimed in claim 5, wherein a switching signal is supplied to said color switching grid, said signal being synchronized with said frequency of the horizontal line scanning.

7. A color television reciver having a single electron gun kinescope and including means for producing from every horizontal sweep of the electron beam from said electron gun a plurality of effective horizontal sweep lines, means for generating a luminance signal, means for generating a delayed luminance signal, and means for applying said luminance signal and delayed luminance signal to successive ones of said effective horizontal sweep lines respectively.

8. The television receiver as claimed in claim 7, wherein said means for producing said plurality of effective sweep lines comprises a wobbling coil affixed about the neck of said color kinescope of said receiver and a high frequency oscillator for driving said wobbling coil to micro-deflect said electron beam.

9. The television receiver as claimed in claim 7, wherein said means for producing said plurality of effective sweep lines comprises an electron gun including a cathode and a plurality of grids for modulating different portions of the beam cross-section.

10. The television receiver as claimed in claim 9, wherein said plurality of grids of said electron gun comprises a first grid partially masking said cathode and defining a cutout portion; a second grid comprising a generally horizontal wire adjacent to and spaced from said cathode and said first grid; and a third grid oppositely disposed about said second grid from said first grid and formed to be effectively the mirror image of said first grid.

11. The television receiver as claimed in claim 10, in which said plurality of grids are vertically aligned to intensity modulate vertically disposed portions of an electron stream from said electron gun.

12. The method of reproducing either a color or a monochrome television picture in a line-sequential manner in a television receiver having a kinescope comprising the steps of:

demodulating a received picture signal to obtain picture information signals;

forming a first signal from said demodulated picture signal information, forming a second signal by delaying at least part of said picture information signals for one horizontal sweep period more than said second signal;

generating an electron stream from said electron gun for sweeping out said television picture such that said stream may trace out at least two effective horizontal sweep lines on said kinescope screen;

modulating said electron stream with said first and second color information signals so that one of said two effective sweep lines is modulated with picture information generally corresponding to said first signal information and another of said effective lines has picture information generally corresponding to said second signal.

13. A color television receiver comprising:

means for demodulating three different color difference signals in line sequence;

means for developing a luminance signal;

first delay means for delaying said luminance signal by approximately one horizontal sweep period;

second delay means for producing a luminance signal delayed by approximately two horizontal sweep periods;

oscillator means for generating a high frequency oscillatory signal;

a switcher keyed by said oscillator means for producing a composite signal comprising a sample of said luminance signal, said first delayed luminance signal and said second delayed luminance signal;

a post-deflection, single electron gun, vertical phosphor strip tri-color kinescope having a post-deflection grid;

a wobbler coil positioned about the neck of said kinescope for producing micro-deflection of the electron stream from said electron gun;

switching signal generator means operatively connected to generate a post-deflection grid potential signal for said kinescope post-deflection grid and synchronized to generate a succession of different color strip deflection signals at a cycle of one-third of line frequency;

means for coupling said demodulator color difference signals to said electron gun of said kinescope;

means for coupling said composite luminance signal from said switcher to said electron gun for modulating said electron stream; and means for coupling said oscillatory signal of said oscillator means to said wobbling coil to produce vertical micro-deflection of said electron beam at said oscillatory signal frequency, said micro-deflection occurring in relation with said switcher composite signal so that said electron beam sweeps out three effective lines each corresponding to a different one of said luminance signals supplied by said switcher.

14. In a color television receiver having:

means for demodulating a chrominance signal to produce line-sequential color difference signals, and having a post-deflection color kinescope comprising:

a post-deflection grid and an electron gun, a cathode having a major vertical dimension for producing an electron stream having a greater vertical cross-sectional dimension than horizontal, and first and second grid means for separately modulating different vertical areas of said beam, a luminance signal generating means;

first delay means for producing a delayed luminance signal;

first circuit means for connecting said luminance signal to said second grid means, and second circuit means for connecting said delayed luminance signal to said first grid means.

15. The color television receiver as defined in claim 14, in which said post-deflection screen potentials are switched to maintain one color scanning for each horizontal sweep period.

References Cited

UNITED STATES PATENTS

| | | | |
|---|---|---|---|
| 2,965,704 | 12/1960 | Schagen | 178—5.4 |
| 3,303,275 | 2/1967 | Sugihara | 178—5.4 |

JOHN W. CALDWELL, *Primary Examiner.*

J. A. O'BRIEN, R. MURRAY, *Assistant Examiners.*